United States Patent
James et al.

(10) Patent No.: US 7,399,437 B2
(45) Date of Patent: *Jul. 15, 2008

(54) METHOD FOR FORMING A POROUS REACTION INJECTION MOLDED CHEMICAL MECHANICAL POLISHING PAD

(75) Inventors: David B. James, Newark, DE (US); John V. H. Roberts, Newark, DE (US)

(73) Assignee: Rohm and Haas Electronics Materials CMP Holdings, Inc., Newark, DE (US)

( * ) Notice: Subject to any disclaimer, the term of this patent is extended or adjusted under 35 U.S.C. 154(b) by 288 days.

This patent is subject to a terminal disclaimer.

(21) Appl. No.: 11/398,419

(22) Filed: Apr. 4, 2006

(65) Prior Publication Data

US 2006/0226568 A1    Oct. 12, 2006

Related U.S. Application Data

(60) Provisional application No. 60/669,321, filed on Apr. 6, 2005.

(51) Int. Cl.
    *B29C 44/06* (2006.01)
(52) U.S. Cl. ..................... 264/45.4; 264/102
(58) Field of Classification Search ................ 425/145, 425/256, 447, 449; 428/147; 451/526, 28, 451/64; 366/136, 137, 139; 264/7, 45.4, 264/51, 102
See application file for complete search history.

(56) References Cited

U.S. PATENT DOCUMENTS

| | | | |
|---|---|---|---|
| 5,489,233 A | 2/1996 | Cook et al. | |
| 5,533,923 A | 7/1996 | Shamoullian et al. | |
| 5,584,146 A | 12/1996 | Shamouilian et al. | |
| 6,837,781 B2 * | 1/2005 | Hishiki | 451/527 |
| 7,275,856 B2 | 10/2007 | Koetas et al. | |
| 7,275,928 B2 | 10/2007 | Kolesar et al. | |
| 2006/0066001 A1 | 3/2006 | Koetas et al. | |
| 2006/0108701 A1 | 5/2006 | Saikin et al. | |
| 2006/0226567 A1 | 10/2006 | James et al. | |
| 2006/0228439 A1 | 10/2006 | James et al. | |
| 2007/0034614 A1 | 2/2007 | McClain et al. | |
| 2007/0066196 A1 | 3/2007 | Saikin | |
| 2007/0210491 A1 | 9/2007 | Saikin et al. | |
| 2007/0235904 A1 | 10/2007 | Saikin et al. | |

* cited by examiner

*Primary Examiner*—Robert B Davis
(74) *Attorney, Agent, or Firm*—Edwin Oh; Thomas S. Deibert

(57) ABSTRACT

The present invention provides a method of forming a chemical mechanical polishing pad comprising, providing a tank with polymeric materials, providing a storage silo with microspheres and providing an isocyanate storage tank with isocyanates. The invention further provides delivering the polymeric materials and the microspheres to a premix prep tank, forming a pre-mixture of the polymeric materials and the microspheres, delivering the pre-mixture to a premix run tank and forming a mixture of the pre-mixture and the isocyanates. Further the invention provides injecting the mixture into a closed mold, curing the polishing pad in the mold and degassing at least one of the tank, isocyanate storage tank and the mold.

8 Claims, 7 Drawing Sheets

METHOD FOR FORMING A POROUS REACTION INJECTION MOLDED CHEMICAL MECHANICAL POLISHING PAD

CROSS REFERENCE TO RELATED APPLICATION

This application claims the benefit of U.S. Provisional Application Ser. No. 60/669,321 filed Apr. 6, 2005.

BACKGROUND OF THE INVENTION

The present invention relates to polishing pads for chemical mechanical planarization, and in particular, relates to polishing pads formed by a reaction-injection molding process (RIM). Further, the present invention relates to apparatuses and methods for forming porous polishing pads formed by a RIM process.

In the fabrication of integrated circuits and other electronic devices, multiple layers of conducting, semiconducting and dielectric materials are deposited on or removed from a surface of a semiconductor wafer. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes nonplanar. Because subsequent semiconductor processing (e.g., metallization) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

Chemical mechanical planarization, or chemical mechanical polishing (CMP), is a common technique used to planarize substrates, such as semiconductor wafers. In conventional CMP, a wafer is mounted on a carrier assembly and positioned in contact with a polishing pad in a CMP apparatus. The carrier assembly provides a controllable pressure to the wafer, pressing it against the polishing pad. The pad is moved (e.g., rotated) relative to the wafer by an external driving force. Simultaneously therewith, a chemical composition ("slurry") or other polishing solution is provided between the wafer and the polishing pad. Thus, the wafer surface is polished and made planar by the chemical and mechanical action of the pad surface and slurry.

Hishiki, U.S. Pat. No. 6,837,781, discloses a polishing pad known in the art manufactured by a RIM process. The polishing pad of Hishiki is formed by dissolving an inert gas in a mixture of polyurethane to create porosity. Unfortunately, polishing pads of Hishiki have large variations in porosity and may cause unpredictable, and perhaps, detrimental, polishing performances from one polishing pad to the next. For example, Examples 1 and 2 in Table 2 (see cols. 11-12) provided polishing pads having an average cell diameter of 15 μm and 3 μm, respectively. Further, Examples 3 and 4 in Table 2 provided polishing pads having an average cell diameter of 30 μm and 150 μm, respectively. In other words, these polishing pads have variations in porosity of up to about 80 percent, which may detrimentally affect polishing performance. Moreover, these variations in porosity may negatively affect polishing performance within the pad itself.

Hence, what is needed is a polishing pad made by a reaction-injection molding process having improved polishing performance. Moreover, what is needed is an apparatus and an efficient method of forming a porous, RIM polishing pad having improved polishing performance.

STATEMENT OF THE INVENTION

In a first aspect of the present invention, there is provided a method of forming a chemical mechanical polishing pad, comprising: providing a tank with polymeric materials; providing a storage silo with microspheres; providing a isocyanate storage tank with isocyanates; delivering the polymeric materials and the microspheres to a premix prep tank; forming a pre-mixture of the polymeric materials and the microspheres; delivering the pre-mixture to a premix run tank; forming a mixture of the pre-mixture and the isocyanates; injecting the mixture into a closed mold; curing the polishing pad in the mold; and degassing at least one of the tank, isocyanate storage tank and the mold.

In a second aspect of the present invention, there is provided a method of forming a chemical mechanical polishing pad, comprising: providing a first polyol storage tank with first polymeric materials; providing a storage silo with microspheres; providing a isocyanate storage tank with isocyanates; providing at least a second polyol storage tank with second polymeric materials; delivering the first polymeric materials from the first polyol storage tank and the microspheres to a premix prep tank; forming a pre-mixture of the first polymeric materials and the microspheres; delivering the pre-mixture to a premix run tank; forming a mixture of the pre-mixture and the isocyanates; providing second polymeric materials to the mixture from the at least second polyol storage tank until a desired bulk density is reached; injecting the mixture into a closed mold; curing the polishing pad in the mold; and degassing at least one of the first and second polyol storage tanks, isocyanate storage tank and the mold.

In a third aspect of the present invention, there is provided a method of forming a chemical mechanical polishing pad, comprising: providing a polyol storage tank with polymeric materials; providing a storage silo with microspheres; providing a isocyanate storage tank with isocyanates; delivering the polymeric materials and the microspheres to a premix run/prep tank; forming a pre-mixture of the polymeric materials and the microspheres; injecting the mixture into a closed mold; curing the polishing pad in the mold; and degassing at least one of the polyol storage tank, isocyanate storage tank and the mold.

DETAILED DESCRIPTION OF THE INVENTION

The present invention provides a reaction-injection molded polishing pad. Further, the present invention provides a novel RIM apparatus and method for forming a porous, reaction-injection molded polishing pad. In particular, the present invention utilizes a unique premix apparatus to produce the porous, reaction-injection molded polishing pad. The premix apparatus comprises, a novel premix prep tank for pre-mixing the microspheres and the polymeric materials (e.g., polyols) to form a homogeneous pre-mixture. The premix apparatus further comprises a vacuum to remove or degas any mechanically entrained or dissolved gas. In addition, the novel reaction-injection molding apparatus provides tremendous flexibility in increasing manufacturing scale and in pad-type variation. In other words, the novel reaction-injection molding apparatus allows, for example, continuous reaction-injection molding and the use of almost an endless combination of different polymeric materials to manufacture the polishing pad of the present invention.

Figure 1:
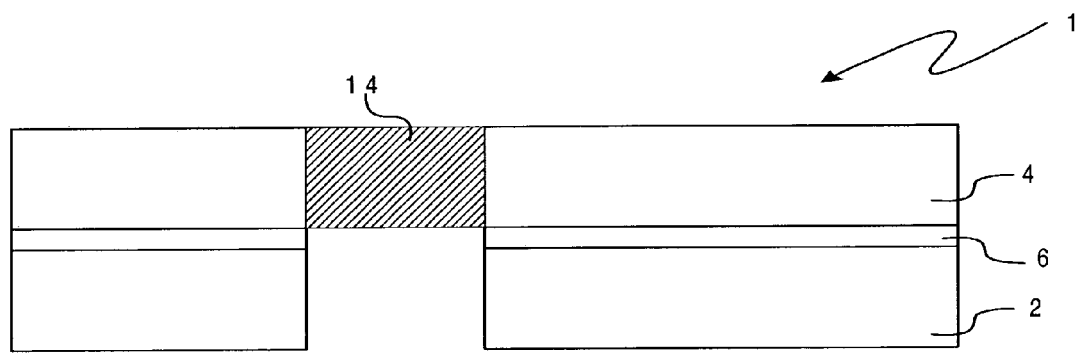
FIG. 1 illustrates a polishing pad of the present invention.

Referring now to FIG. 1, a polishing pad 1 of the present invention is shown. Polishing pad 1 comprises a polishing layer or pad 4, and an optional bottom layer or pad 2. The bottom layer 2 may be made of felted polyurethane, such as SUBA-IV™ pad manufactured by Rohm and Haas Electronic Materials CMP Inc. ("RHEM"), of Newark, DE. The polishing pad 4 may comprise a polyurethane pad, such as, OXP 4150™ pad by RHEM. Polishing pad 4 may optionally be texturized as desired. A thin layer of pressure sensitive adhesive 6 may hold the polishing pad 4 and the bottom layer 2 together. The adhesive 6 may be commercially available from 3M Innovative Properties Company of Saint Paul, Minn. In addition, polishing pad 4 may have a transparent window 14 provided therein to facilitate end-point detection.

Figure 2:
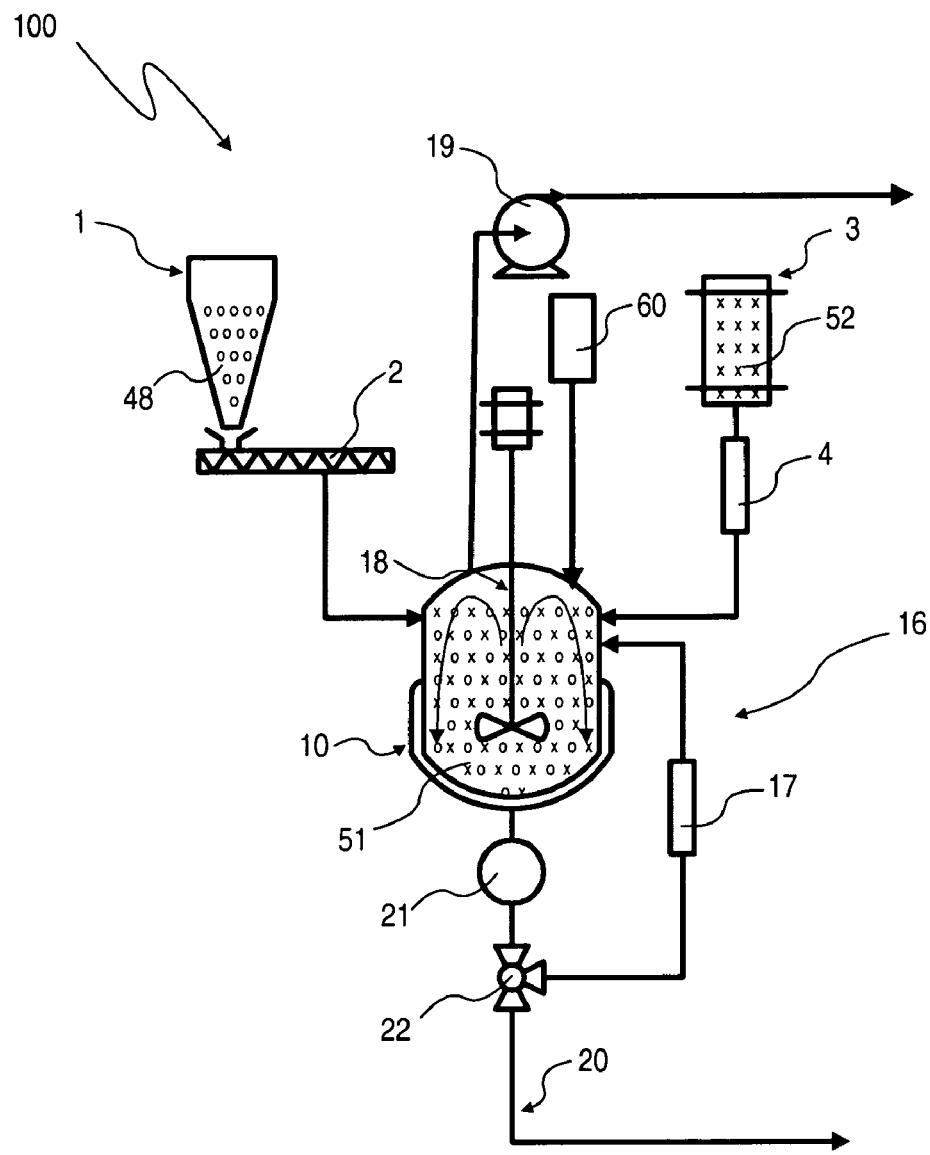
FIG. 2 illustrates an apparatus for forming the polishing pad of the present invention.

Referring now to FIG. 2, a premix apparatus 100 for forming the polishing pad 4 of the present invention is shown. The premix apparatus 100 comprises a filler storage silo 1 sized to hold a sufficient quantity of microspheres or microelements 48. Premix apparatus 100 further comprises a premix prep tank 10 and a storage tank 3 sized to hold a sufficient quantity of polymeric materials 52 (e.g., polyol). In addition, premix apparatus 100 advantageously comprises a recirculation loop 16 for controlling the bulk density of the pre-mixture 51 in the premix prep tank 10. Note, although the premix apparatus 100 is described with reference to a "one tank" system, the invention is not so limited. For example any number of storage silos 1, polyol storages 3 and premix prep tanks 10 may be utilized in the present invention, as desired.

In operation, a predetermined amount of the polymeric materials 52 is added to the premix prep tank 10. The quantity of the polymeric materials 52 added to the premix prep tank 10 may be controlled by a mass flow metering device 4 with a totalizer (not shown). The quantity of polyol 52 added to the premix prep tank 10 may also be controlled by using load cells mounted to the premix prep tank 10.

After the polymeric materials 52 are added to the premix prep tank 10, the agitator 18 agitates the polymeric materials 52 to provide an upward, axial flow of the polymeric materials 52 along the shaft of the agitator 18 resulting in a downward flow of the materials 52 along the inner wall of the premix prep tank 10. Alternatively, the polymeric materials 52 may flow in the opposite direction, as desired. Preferably, the agitator is rotated at a rate of 1 to 500 RPM. More preferably, the agitator is rotated at a rate of 1 to 250 RPM. Most preferably, the agitator is rotated at a rate of 1 to 50 RPM.

Upon activation of the agitator 18, the microspheres 48 in the filler storage silo 1 may be added to the premix prep tank 10. In an exemplary embodiment of the invention, the amount of the microspheres 48 added to the premix prep tank 10 may be performed by a "loss in weight" dry feed metering system 2. The dry feed metering system 2 establishes an initial total weight of the filler storage silo 1, including the microspheres 48 contained within the storage silo 1. Thereafter, a predetermined weight of the microspheres 48 that is to be added to the premix prep tank 10 is set in the dry feed metering system 2. The dry feed metering system 2 may then add the microspheres 48 to the premix prep tank 10 until the change in weight of the filler storage silo 1 matches the desired, predetermined weight of the microspheres 48.

After an appropriate amount of the microspheres 48 is measured out, the microspheres 48 are added to the polymeric materials 52 and blended together to form a pre-mixture 51, assisted by the agitation of the agitator 18. Advantageously, the ratio of the amount of microspheres 48 to that of the polymeric materials 52 is 0 to 50 percent by volume. More advantageously, the ratio of the amount of microspheres 48 to that of the polymeric materials 52 is 0 to 40 percent by volume. Most advantageously, the ratio of the amount of microspheres 48 to that of the polymeric materials 52 is 0.1 to 30 percent by volume.

Advantageously, once the microspheres 48 are blended in the polymeric materials 52, the pre-mixture 51 is re-circulated in recirculation loop 16 to ensure that the pre-mixture 51 remains essentially homogeneous. The recirculation loop 16 helps the pre-mixture 51 to be more uniformly distributed in the premix prep tank 10 and reduces the potential for density stratification. In other words, the recirculation loop 16 allows for an efficient method of controlling or stabilizing the bulk density of the pre-mixture 51.

Advantageously, the recirculation pump 21 draws the pre-mixture 51 from the premix prep tank 10 and directs the pre-mixture 51 through a directional valve 22, the valve 22 returning the pre-mixture 51 back to the premix prep tank 10. The recirculation pump 21 can be a diaphragm, peristaltic, sine, piston, screw, progressive cavity, lobe or gear type pump requiring no contact lubrication. The bulk density of the pre-mixture 51 can be monitored by manually, periodically sampling the pre-mixture 51 (weight per volume) in conjunction with a scale (not shown).

Optionally, an in-line densitometer 17 may be provided in the re-circulation loop 16 to monitor the homogeneity (i.e., density) of the pre-mixture 51. Advantageously, the in-line densitometer 17 provides an automated method for measuring and displaying the continuous bulk density of the pre-mixture 51. The in-line densitometer 17 may measure and display density measurements. The in-line densitometer 17 may be commercially obtained from, for example, Anton Paar of Graz, Austria. The in-line densitometer 17 measures the bulk density (ratio of microspheres 48 to polymeric materials 52) of the pre-mixture 51. If the bulk density is outside a pre-determined, acceptable range, the in-line densitometer 17 can be used to monitor the addition of either microspheres 48 or polymeric materials 52 to adjust the bulk density of the pre-mixture 51 into the desired range.

In operation, the in-line densitometer 17 measures the incoming bulk density of the pre-mixture 51 from the directional valve 22. If the measured bulk density is within acceptable, predetermined tolerances, then the pre-mixture 51 is directed by the directional valve 22 to the transfer line 20 for further processing. If the measured bulk density is too high or low, then the pre-mixture 51 is directed by the directional valve 22 to the recirculation loop 16, back to the premix prep tank 10, and is not diverted to the transfer line 20. Rather, the pre-mixture 51 continues to re-circulate. The density measurement of the pre-mixture 51 obtained from the densitometer 17, will be used to provide additional polyol 52 or microspheres 48, as desired. Note, the pre-mixture 51 can be returned to the premix prep tank 10 at any level that does not interfere with the discharge of the pre-mixture 51 from the bottom of the premix prep tank 10. Preferably, the pre-mixture 51 is returned in a manner that reduces the amount of entrained gas being introduced into the premixture 51, for example, by returning the pre-mixture 51, subsurface to the storage of the pre-mixture 51 in the tank 10 or by returning the pre-mixture 51 along the inner wall of the tank 10.

Advantageously, the premix prep tank 10 is provided with a vacuum source 19 to remove or degas any entrained gas from the addition of the microspheres 48 to the polymeric materials 52, in order to obtain a more accurate bulk density measurement. Preferably, the premix prep tank 10 is degassed at a pressure of 1 to 10 torr. More preferably, the premix prep tank 10 is degassed at a pressure of 1 to 5 torr. Most preferably, the premix prep tank 10 is degassed at a pressure of less than 2 torr. In addition, the premix apparatus 100 may further comprise an inert gas source 60 to provide a "blanket" inert gas to the pre-mixture 51 when the premix prep tank 10 is not under vacuum from the vacuum source 19. Note, the inert gas is not utilized to create porosity, but rather to reduce them when the vacuum source 19 is turned off.

Preferably, at least a portion of the polymeric microspheres 48 are generally flexible. Suitable polymeric microspheres 48 include inorganic salts, sugars and water-soluble particles. Examples of such polymeric microspheres 48 (or microelements) include polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes, cyclodextrin, polyacrylonitrile, polyvinylidene chloride, acrylonitrile and vinylidene chloride and combinations thereof. The microspheres 48 may be chemically modified to change the solubility, swelling and other properties by branching, blocking, and crosslinking, for example. Preferably, the microspheres 48 has a mean diameter that is less than 150 μm, and more preferably a mean diameter of less than 50 μm. Most Preferably, the microspheres 48 has a mean diameter that is less than 15 μm. Note, the mean diameter of the microspheres may be varied and different sizes or mixtures of different microspheres 48 may be impregnated in the polymeric material 52 as desired. A preferred material for the microsphere is a copolymer of polyacrylonitrile and polyvinylidene chloride (e.g., Expancel™ from Akzo Nobel of Sundsvall, Sweden).

Additionally, in an exemplary embodiment of the present invention, the polymeric material 52 of polishing pad 4 is made from a hydroxyl-containing material. Advantageously, the hydroxyl-containing material is a polyol. Exemplary polyols include, but are not limited to, polyether polyols, hydroxy-terminated polybutadiene (including partially/fully hydrogenated derivatives), polyester polyols, polycaprolactone polyols, polycarbonate polyols, and mixtures thereof.

In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG. Suitable polyester polyols include, but are not limited to, polyethylene adipate glycol, polybutylene adipate glycol, polyethylene propylene adipate glycol, o-phthalate-1,6-hexanediol, poly(hexamethylene adipate) glycol, and mixtures thereof. The hydrocarbon chain can have saturated or unsaturated bonds, or substituted or unsubstituted aromatic and cyclic groups. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups. Suitable polycarbonates include, but are not limited to, polyphthalate carbonate and poly(hexamethylene carbonate) glycol.

Additionally, the polymeric material 52 is a polydiamine. Preferred polydiamines include, but are not limited to, diethyl toluene diamine ("DETDA"), 3,5-dimethylthio-2,4-toluenediamine and isomers thereof, 3,5-diethyltoluene-2,4-diamine and isomers thereof, such as 3,5-diethyltoluene-2,6-diamine, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline) ("MCDEA"), polytetramethyleneoxide-di-p-aminobenzoate, N,N'-dialkyldiamino diphenyl methane, p,p'-methylene dianiline ("MDA"), m-phenylenediamine ("MPDA"), methylene-bis 2-chloroaniline ("MBOCA"), 4,4'-methylene-bis-(2-chloroaniline) ("MOCA"), 4,4'-methylene-bis-(2,6-diethylaniline) ("MDEA"), 4,4'-methylene-bis-(2,3-dichloroaniline) ("MDCA"), 4,4'-diamino-3,3'-diethyl-5,5'-dimethyl diphenylmethane, 2,2',3,3'-tetrachloro diamino diphenylmethane, trimethylene glycol di-p-aminobenzoate, and mixtures thereof. Preferably, the polymeric material of the present invention includes 3,5-dimethylthio-2,4-toluenediamine and isomers thereof. Suitable polyamines include both primary and secondary amines. Also, blends of the above polyols and polydiamines may be utilized.

Optionally, other polymeric materials such as, a diol, triol, tetraol, or hydroxy-terminated isocyanate may be added to the aforementioned polyurethane composition. Suitable diol, triol, and tetraol groups include ethylene glycol, diethylene glycol, polyethylene glycol, propylene glycol, polypropylene glycol, lower molecular weight polytetramethylene ether glycol, 1,3-bis(2-hydroxyethoxy) benzene, 1,3-bis-[2-(2-hydroxyethoxy)ethoxy]benzene, 1,3-bis-{2-[2-(2-hydroxyethoxy)ethoxy]ethoxy}benzene, 1,4-butanediol, 1,5-pentanediol, 1,6-hexanediol, resorcinol-di-(beta-hydroxyethyl) ether, hydroquinone-di-(beta-hydroxyethyl) ether, and mixtures thereof. Preferred hydroxy-terminated isocyanates include 1,3-bis(2-hydroxyethoxy) benzene, 1,3-bis-[2-(2-hydroxyethoxy)ethoxy]benzene, 1,3-bis-{2-[2-(2-hydroxyethoxy)ethoxy]ethoxy}benzene, 1,4-butanediol, and mixtures thereof. Both the hydroxy-terminated and amine isocyanates can include one or more saturated, unsaturated, aromatic, and cyclic groups. Additionally, the hydroxy-terminated and amine isocyanates can include one or more halogen groups. The polyurethane composition can be formed with a blend or mixture of isocyanates. If desired, however, the polyurethane composition may be formed with a single isocyanate.

As further discussed below, the polymeric material (e.g. hydroxyl-containing material) is then reacted with a polyisocyanate (e.g., diisocyanate). The polyisocyanate may be aliphatic or aromatic. Preferred polyisocyanates include, but are not limited to, methlene bis 4,4' cyclohexylisocyanate, cyclohexyl diisocyanate, isophorone diisocyanate, hexamethylene diisocyanate, propylene-1,2-diisocyanate, tetramethylene-1,4-diisocyanate, 1,6-hexamethylene-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethylcyclohexane, methyl cyclohexylene diisocyanate, triisocyanate of hexamethylene diisocyanate, triisocyanate of 2,4,4-trimethyl-1,6-hexane diisocyanate, uretdione of hexamethylene diisocyanate, ethylene diisocyanate, 2,2,4-trimethylhexamethylene diisocyanate, 2,4,4-trimethylhexamethylene diisocyanate, dicyclohexylmethane diisocyanate, toluene diisocyanate (TDI), TDI prepolymer, methylene diphenyl diisocyanate (MDI), crude MDI, polymeric MDI, urethodione-modified MDI, carbodimide-modified MDI, and mixtures thereof. The preferred polyisocyanate is aromatic. The preferred aromatic polyisocyanate has less than 14 percent unreacted isocyanate groups.

Optionally, a catalyst may be utilized to decrease the polymerization reaction time, particularly the gel time and the de-mold time. However, if the reaction is too fast, the material may solidify or gel prior to complete filling of the mold. Gel time is preferably in the range of a half second to one hour, more preferably in the range of about 1 second to 5 minutes, more preferably 10 seconds to 5 minutes, and yet more preferably 30 seconds to 5 minutes. The most preferred catalysts comprise a tertiary amine, such as, diazo-bicyclo-octane. Other useful catalysts include, organic acids, organometallics, primary amines and secondary amines, depending upon the particular reactive chemistry chosen. The catalysts can be di-functional, tri-functional, etc.

Figure 3:
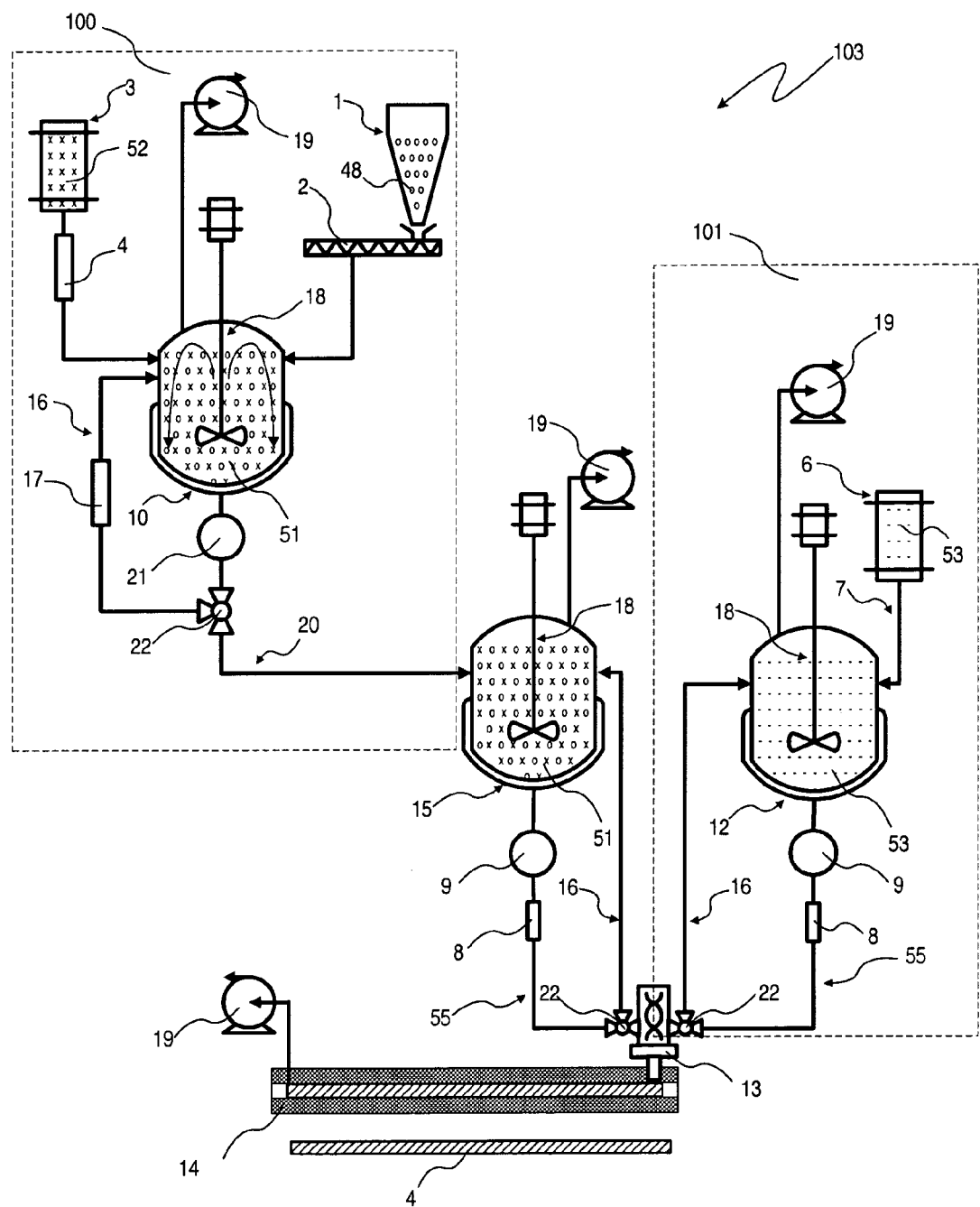
FIG. 3 illustrates another embodiment of an apparatus for forming the polishing pad of the present invention.

Referring now to FIG. 3, a reaction-injection molding apparatus 103, which includes the premix apparatus 100 and a premix run tank 15 as well as a isocyanate apparatus 101, is illustrated. Isocyanate apparatus 101 further comprises a isocyanate run tank 12 and a isocyanate storage tank 6. Note, although this embodiment is illustrated with a single premix run tank 15 and a single isocyanate apparatus 101, any number of premix run tanks and isocyanate tanks may be utilized, as desired. In operation, once a homogeneous blend with an acceptable bulk density is prepared in the premix apparatus 100, the pre-mixture 51 may then be transferred to the premix run tank 15 via the transfer line 20. The transfer line 20 can comprise any non-rusting metal, plastic or polymeric material. This transfer is accomplished by drawing the pre-mixture 51 from the bottom of the premix prep tank 10 using the transfer pump 21, passing the pre-mixture 51 through the directional valve 22, which diverts the flow to the transfer line 20, and sending the pre-mixture into the premix run tank 15. Advantageously, once the pre-mixture 51 is transferred from the premix prep tank 10 to the premix run tank 15, the premix prep tank 10 is available for the preparation of a new batch of the pre-mixture 51. In addition, the pre-mixture 51 contained in the premix run tank 15 is now available for reaction-injection molding. As shown, by having a separate premix preparation process of the present invention, an uninterrupted reaction-injection molding process is possible.

During reaction-injection molding, the pre-mixture 51 from the premix run tank 15 and the isocyanate 53 from the isocyanate run tank 12 are metered to a mixer 13 where the individual components 51, 53 are blended and molded directly in closed mold 14. The molded article is then cured to form the polishing pad 4 of the present invention. Advantageously, the mold 14 is provided with a vacuum 19 to remove or degas any mechanically entrained gas. The premix run tank 15 and the isocyanate run tank 12 are also provided with an agitator 18, similar to the agitator 18 of the premix prep tank 10. Additional isocyanate 53 is provided from a isocyanate storage tank 6 by a level controller 7. Note, any remaining components 51, 53 may be directed back to the respective tanks 15, 12 by a directional valve 22 for further processing via recirculation loop 16.

Advantageously, the bulk density of the polishing pad 4 is directly controlled by the ratio of the mixture of the two individual components 51, 53. The ratio of the mixture of the components 51, 53 from the premix run tank 15 and the isocyanate run tank 12 is controlled by individual metering pumps 9 in-conjunction with flow meters 8 contained within the delivery line 55.

Accordingly, the present invention provides a method of forming a chemical mechanical polishing pad comprising, providing a tank with polymeric materials, providing a storage silo with microspheres and providing a isocyanate storage tank with isocyanates. The invention further provides delivering the polymeric materials and the microspheres to a premix prep tank, forming a pre-mixture of the polymeric materials and the microspheres, delivering the pre-mixture to a premix run tank and forming a mixture of the pre-mixture and the isocyanates. Further the invention provides injecting the mixture into a closed mold, curing the polishing pad in the mold and degassing at least one of the tank, isocyanate storage tank and the mold.

Figure 4:
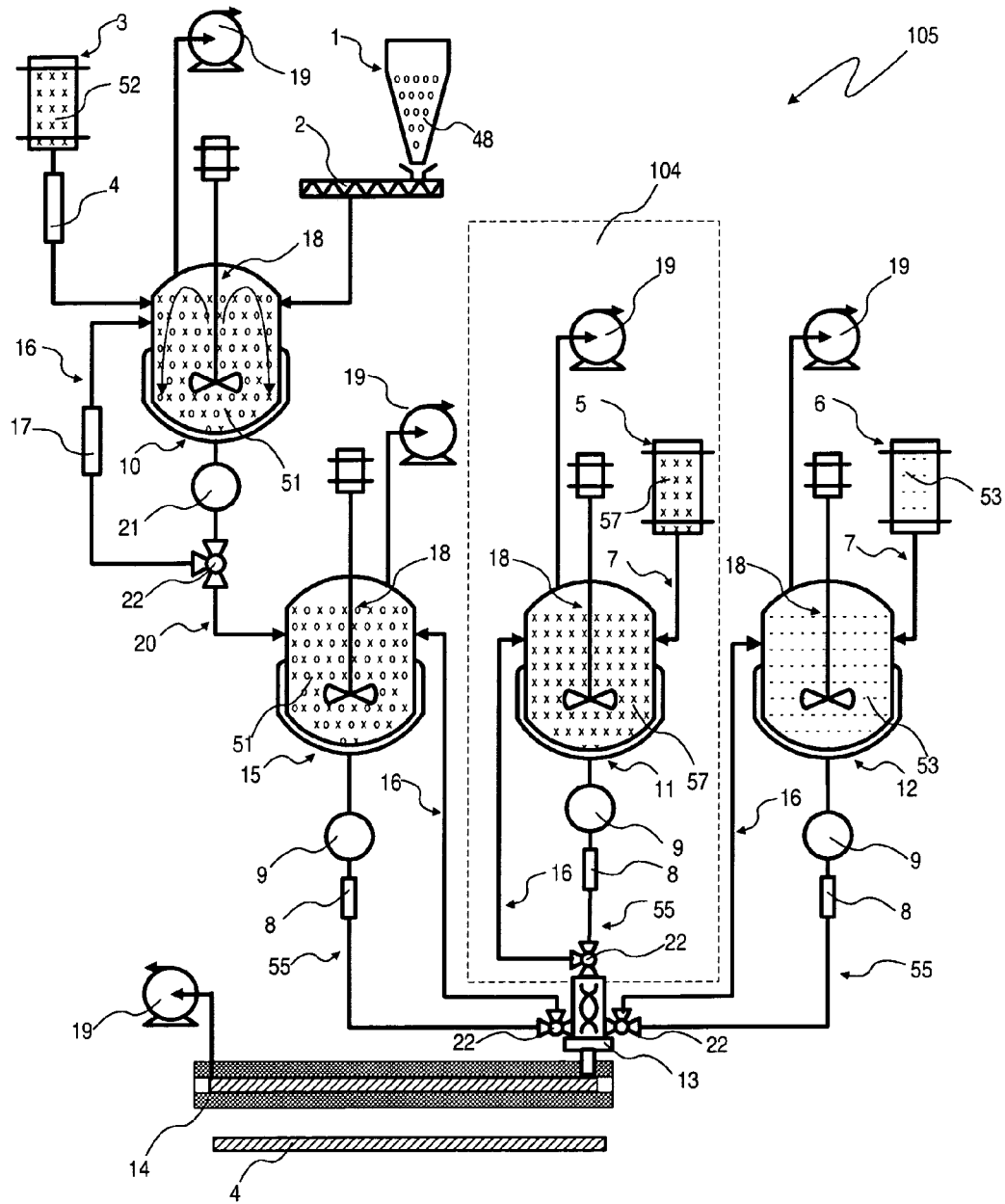
FIG. 4 illustrates another embodiment of an apparatus for forming the polishing pad of the present invention.

Referring now to FIG. 4, a reaction-injection molding apparatus 105, which includes a polyol apparatus 104 is illustrated. Polyol apparatus 104 further comprises a polyol run tank 11 and a secondary polyol storage tank 5. In this embodiment, the polyol run tank 11 allows for the additional, flexible control of the bulk density of the molded article in the reaction-injection molding mold 14. For example, the final bulk density ratio of the microspheres 48 to polyol 57 can be adjusted by the addition of a non-filled polyol 57 from the polyol run tank 11 to the mixer 13 along with the component addition from the premix run tank 15 and the isocyanate run tank 12. The addition of the non-filled polyol 57 to the mixer 13 is regulated by the flow control meter 8 and the metering pump 9. The polyol run tank 11 is also provided with an agitator 18, similar to the agitator 18 of the premix prep tank 10. Additional polymeric materials 57 to the polyol run tank 11 is provided from a secondary polyol storage tank 5 by the level controller 7. Note, although a single polyol run tank 11 is shown, the invention may be practiced with any number of additional polyol run tanks, as desired. In addition, the polyol 57 may be the same as the polyol 52 or any other polymeric material, as desired. Note, any remaining components 51, 57, 53 may be directed back to the respective tanks 15, 11, 12 by a directional valve 22 for further processing via recirculation loop 16.

During reaction-injection molding, the pre-mixture 51 from the premix run tank 15, the isocyanate 53 from the isocyanate run tank 12 and polyol 57 from the polyol run tank 11 are metered to a mixer 13 where the individual components 51, 53 and 57 are blended and injected into a closed mold 14. The molded article is then cured to form a polishing pad 4 of the present invention. Advantageously, the bulk density of the polishing pad 4 is directly controlled by the ratio of the mixture of the three individual components 51, 53 and 57. The ratio of the mixture of the components 51, 53 and 57 from the premix run tank 15, the isocyanate run tank 12 and the polyol run tank 11 is controlled by individual metering pumps 9 in-conjunction with flow meters 8 contained within the delivery lines 55.

Advantageously, the polyol run tank 11 and mold 14 are provided with a vacuum 19 to remove or degas any mechanically entrained gas. Additionally, the premix run tank 15 and the isocyanate run tank 12 are also provided with a vacuum 19. Preferably, the premix prep tank 10 is degassed at a pressure of 1 to 10 Torr. More preferably, the premix prep tank 10 is degassed at a pressure of 1 to 5 Torr. Most preferably, the premix prep tank 10 is degassed at a pressure of less than 2 Torr.

Accordingly, the present invention provides a method of forming a chemical mechanical polishing pad, comprising the steps of, providing a first polyol storage tank with first polymeric materials, providing a storage silo with microspheres, providing a isocyanate storage tank with isocyanates and providing at least a second polyol run tank with second polymeric materials. Further, the method provides the steps of, delivering the polymeric materials from the first polyol storage tank and the microspheres to a premix prep tank, forming a pre-mixture of the first polymeric materials and the microspheres, and delivering the pre-mixture to a premix run tank. The method further provides the steps of forming a mixture of the pre-mixture and the isocyanates, providing second polymeric materials to the mixture from the at least second polyol run tank until a desired bulk density is reached, injecting the mixture into a closed mold and curing the polishing pad in the mold. Finally, the invention further provides degassing at least one of the first and second polyol storage tanks, isocyanate storage tank and the mold.

Figure 5:
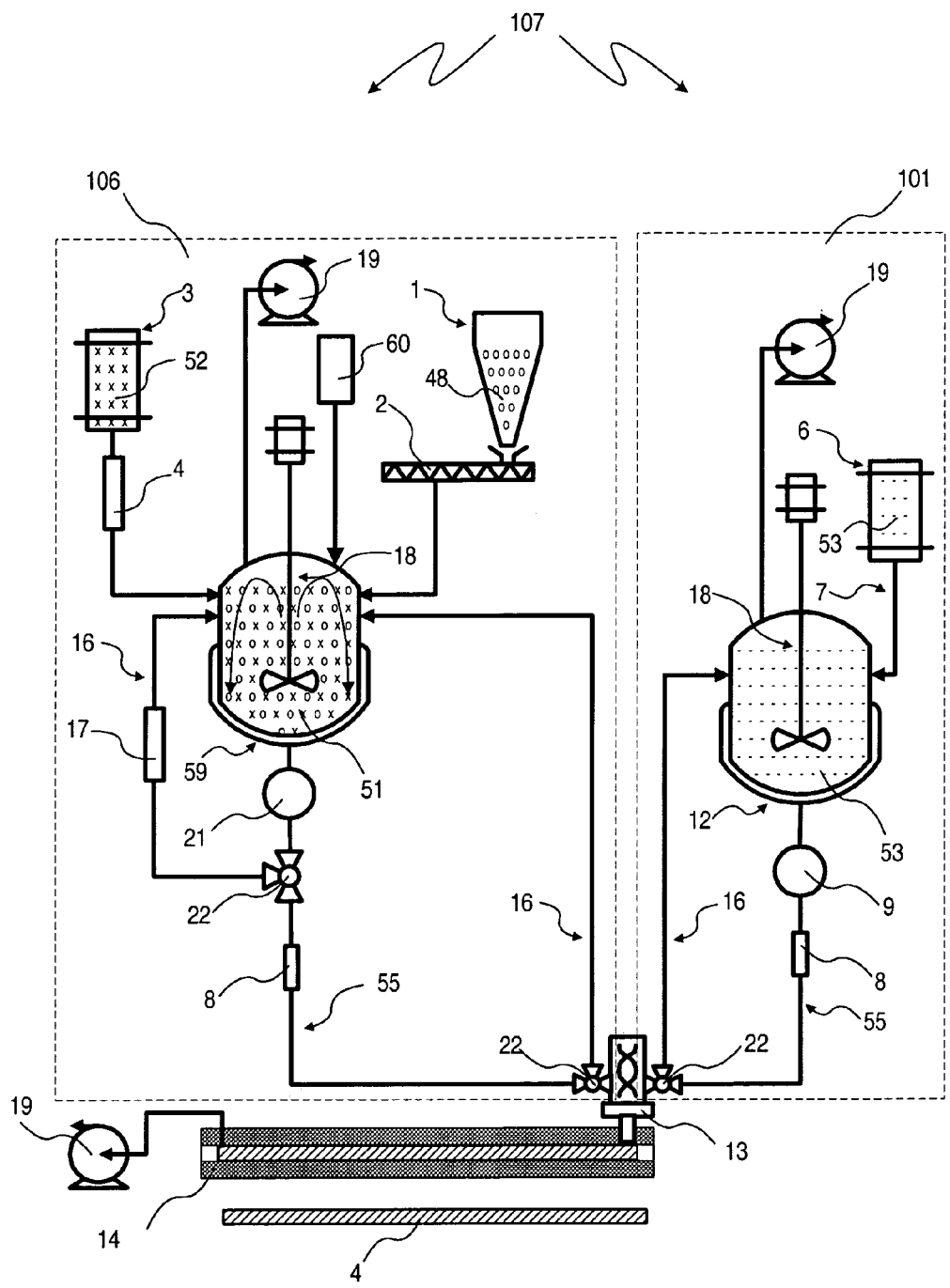
FIG. 5 illustrates another embodiment of an apparatus for forming the polishing pad of the present invention.

Referring now to FIG. 5, a reaction-injection molding apparatus 107 comprising a premix run/prep apparatus 106 and a isocyanate apparatus 101, is illustrated. Premix run/prep apparatus 106 further comprises a filler storage silo 1 sized to hold a sufficient quantity of microspheres or microelements 48. Premix run/prep apparatus 106 further comprises a premix run/prep tank 59 and a polyol storage tank 3 sized to hold a sufficient quantity of polymeric material 52. In addition, premix run/prep apparatus 106 advantageously comprises a recirculation loop 16 for controlling the bulk density of the premixture 51 in the premix run/prep tank 59. Note, in contrast to the embodiments of FIGS. 2, 3 and 4, the embodiment of FIG. 5 (and FIG. 6, below) provides a premix prep tank and a premix run tank in a single run/prep tank. In other words, the embodiment of FIG. 5 (and FIG. 6) eliminates the need for a "transfer step" between the premix prep tank and the premix run tank. Note, however, that while this embodiment allows for batch reaction-injection molding of the polishing pad of the present invention, it does not allow for continuous reaction-injection molding.

In operation, a predetermined amount of the polymeric materials 52 is added to the premix run/prep tank 59. The quantity of the polymeric materials 52 added to the premix run/prep tank 59 may be controlled by a mass flow metering device 4. The quantity of polyol 52 added to the premix run/prep tank 59 may also be controlled by using load cells mounted to the premix run/prep tank 59.

After the polymeric materials 52 are added to the premix run/prep tank 59, the agitator 18 agitates the polymeric materials 52 to provide an upward, axial flow of the polymeric materials 52 along the shaft of the agitator 18 resulting in a downward flow of the polymeric materials 52 along the inner wall of the premix run/prep tank 59. Preferably, the agitator is rotated at a rate of 1 to 500 RPM. More preferably, the agitator is rotated at a rate of 1 to 250 RPM. Most preferably, the agitator is rotated at a rate of 1 to 50 RPM.

Upon activation of the agitator 18, the microspheres 48 in the file storage silo 1 may be added to the premix run/prep tank 59. In an exemplary embodiment of the invention, the amount of the microspheres 48 added to the premix run/prep tank 59 may be performed by a "loss in weight" dry feed metering system 2. The dry feed metering system 2 establishes an initial total weight of the filler storage silo 1, including the microspheres 48 contained within the storage silo 1. Thereafter, a predetermined weight of the microspheres 48 that is to be added to the premix prep tank 10 is set in the dry feed metering system 2. The dry feed metering system 2 may then add the microspheres 48 to the premix prep tank 10 until the change in weight of the filler storage silo 1 matches the desired, predetermined weight of the microspheres 48.

After an appropriate amount of the microspheres 48 is measured out, the microspheres 48 are added to the polymeric materials 52 and blended together to form a pre-mixture 51, assisted by the agitation of the agitator 18. Advantageously, the ratio of the amount of microspheres 48 to that of the polymeric materials 52 is 0 to 50 percent by volume. More advantageously, the ratio of the amount of microspheres 48 to that of the polymeric materials 52 is 0 to 40 percent by volume. Most advantageously, the ratio of the amount of microspheres 48 to that of the polymeric materials 52 is 0.1 to 30 percent by volume.

Advantageously, once the microspheres 48 are blended in the polymeric materials 52, the pre-mixture 51 is re-circulated in recirculation loop 16 to ensure that the pre-mixture 51 remains essentially homogeneous. The recirculation loop 16 helps the pre-mixture 51 to be more uniformly distributed in the premix run/prep tank 59 and reduces the potential for density stratification. In other words, the recirculation loop 16 allows for an efficient method of controlling the bulk density of the pre-mixture 51. The bulk density of the pre-mixture 51 can be monitored by manually, periodically sampling the pre-mixture 51 in conjunction with a scale (not shown).

Advantageously, the recirculation pump 21 draws the premixture 51 from the premix run/prep tank 59 and directs the pre-mixture 51 through a directional valve 22, the valve 22 returning the pre-mixture 51 back to the premix run/prep tank 59. The recirculation pump 21 can be a diaphragm, peristaltic, sine, or lobe type pump requiring no contact lubrication. Optionally, an in-line densitometer 17 may be provided in the re-circulation loop 16 to monitor the homogeneity of the pre-mixture 51. Advantageously, the in-line densitometer 17 provides an automated method for measuring the continuous bulk density of the pre-mixture 51. The in-line densitometer 17 may measure and display density measurements. The in-line densitometer 17 measures the bulk density (ratio of microspheres 48 to polymeric materials 52) of the pre-mixture 51. If the bulk density is outside a pre-determined, acceptable range, the in-line densitometer 17 can be used to monitor the addition of either microspheres 48 or polymeric materials 52 to adjust the bulk density of the pre-mixture 51 into the desired range.

In operation, the in-line densitometer 17 measures the incoming bulk density of the pre-mixture 51 from the directional valve 22. If the calculated bulk density is within acceptable, predetermined tolerances, then the measured pre-mixture 51 is directed by the directional valve 22 to the delivery line 55. If the calculated bulk density is too high or low, then the measured pre-mixture 51 is directed by the directional valve 22 to the recirculation loop 16, back to the premix run/prep tank 59, to be agitated again. In other words, if the bulk density is too high, then additional agitation is conducted. Note, the pre-mixture 51 can be returned to the premix run/prep tank 59 at any level that does not interfere with the discharge of the pre-mixture 51 from the bottom of the premix run/prep tank 59.

Advantageously, the premix run/prep tank 59 is provided with a vacuum 19 to remove or degas any entrained gas from the addition of the microspheres 48 to the polymeric materials 52, in order to obtain a more accurate bulk density measurement. Preferably, the premix run/prep tank 59 is degassed at a pressure of 1 to 10 Torr. More preferably, the premix prep tank 10 is degassed at a pressure of 1 to 5 Torr. Most preferably, the premix prep tank 10 is degassed at a pressure of less than 2 Torr.

Referring still to FIG. 5, the isocyanate apparatus 101 further comprises a isocyanate run tank 12 and a isocyanate storage tank 6. Note, although this embodiment is illustrated with a single isocyanate apparatus 101, any number of isocyanate apparatuses may be utilized, as desired. During reaction-injection molding, the pre-mixture 51 from the premix run/prep tank 59 and the isocyanate 53 from the isocyanate run tank 12 are metered to a mixer 13 where the individual components 51, 53 are blended and molded directly into a closed mold 14. The molded article is then cured to form the polishing pad 4 of the present invention. Advantageously, the mold 14 is provided with a vacuum 19 to remove or degas any mechanically entrained gas. Note, any remaining components 51, 53 may be directed back to the respective tanks 59,12 by a directional valve 22 for further processing via recirculation loop 16. The premix run/prep tank 59 and the isocyanate run tank 12 are also provided with an agitator 18, similar to the agitator 18 of the premix prep tank 10. Additional isocyanate 53 is provided from a isocyanate storage tank 6 by a level controller 7. Advantageously, the bulk density of the polishing pad 4 is directly controlled by the ratio of the mixture of the two individual components 51, 53. The ratio of the mixture of the components 51, 53 from the premix run/prep tank 59 and the isocyanate run tank 12 is controlled by recirculation pump 21 and metering pump in-conjunction with flow meters 8 contained within the delivery line 55.

Figure 6:
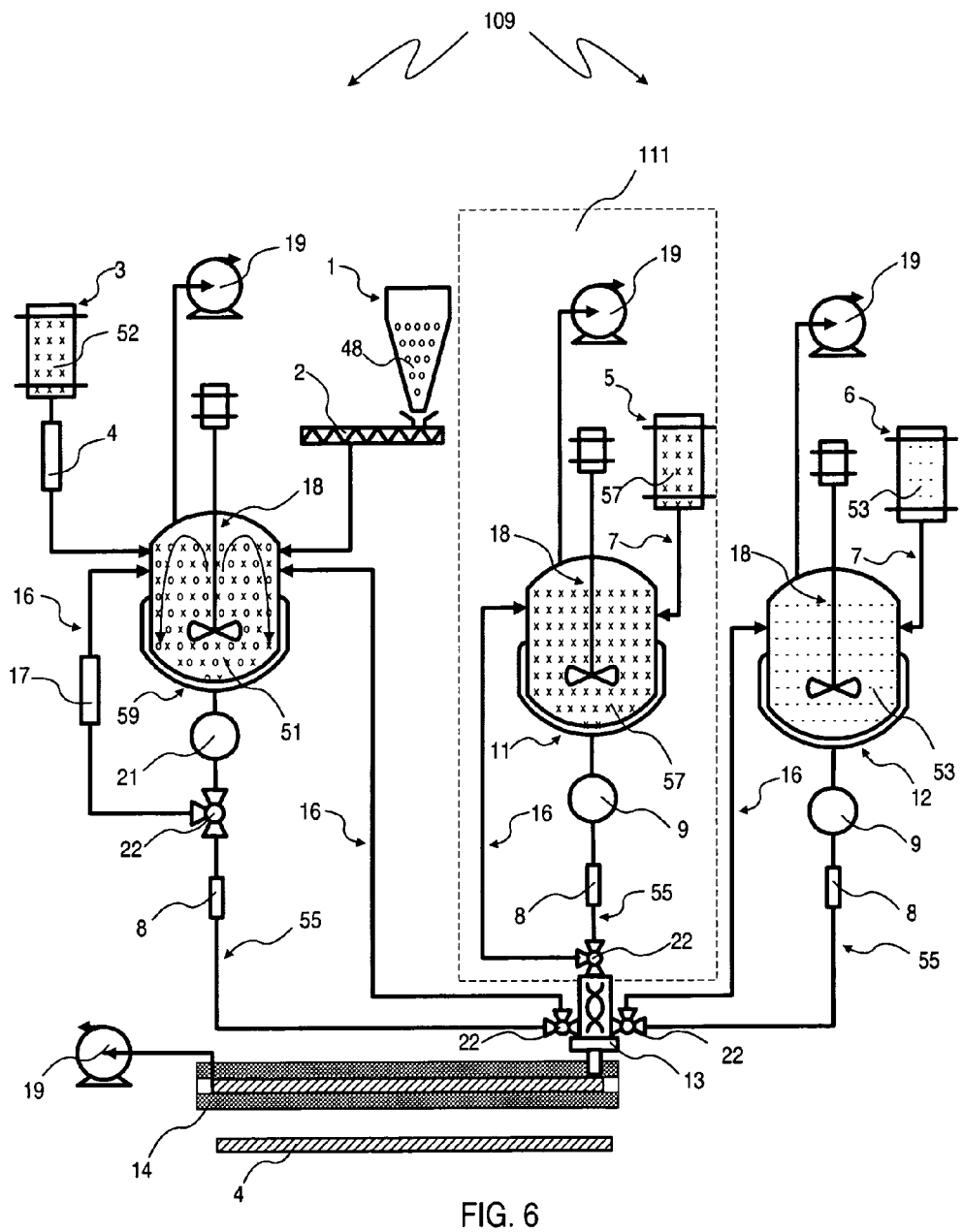
FIG. 6 illustrates another embodiment of an apparatus for forming the polishing pad of the present invention.

Referring now to FIG. 6, a reaction-injection molding apparatus 109 comprising a secondary polyol apparatus 111, is illustrated. Polyol apparatus 111 further comprises a secondary polyol run tank 11 and a secondary polyol storage tank 5. In this embodiment, the polyol run tank 11 allows for the additional, flexible control of the molded article in the reaction-injection molding mold 14. For example, the final bulk density ratio of the microspheres 48 to polyol 52 can be adjusted by the addition of a non-filled polyol 57 from the polyol run tank 11 to the mixer 13 along with the component addition from the premix run/prep tank 59 and the isocyanate run tank 12. The addition of the non-filled polyol 57 to the mixer 13 is regulated by the flow control meter 8 and the metering pump 9. The polyol run tank 11 is also provided with an agitator 18, similar to the agitator 18 of the premix prep tank 10. Additional polymeric materials 57 to the polyol run tank 11 is provided from the secondary polyol storage tank 5 by the level controller 7. Note, although a single polyol run tank 11 is shown, the invention may be practiced with any number of additional polyol run tanks, as desired. In addition, the polyol 57 may be the same as the polyol 52 or any other polymeric material, as desired.

During reaction-injection molding, the pre-mixture 51 from the premix run/prep tank 59, the isocyanate 53 from the isocyanate run tank 12 and non-filled polyol 57 from the polyol run tank 11 are metered to a mixer 13 where the individual components 51, 53 and 57 are blended and molded directly into a mold 14. The molded article is then cured to form polishing pad 4 of the present invention. Advantageously, the bulk density of the polishing pad 4 is directly controlled by the ratio of the mixture of the three individual components 51, 53 and 57. The ratio of the mixture of the components 51, 53 and 57 from the premix run/prep tank 59, the isocyanate run tank 12 and the polyol run tank 11 is controlled by individual metering pumps 9 in-conjunction with flow meters 8 contained within the delivery line 55.

Advantageously, the polyol run tank 11 and mold 14 are provided with a vacuum 19 to remove or degas any mechanically entrained gas. Additionally, the premix run/prep tank 59 and the isocyanate run tank 12 are also provided with a vacuum 19. Preferably, the premix prep tank 10 is degassed at a pressure of 1 to 10 Torr. More preferably, the premix prep tank 10 is degassed at a pressure of 1 to 5 Torr. Most preferably, the premix prep tank 10 is degassed at a pressure of less than 2 Torr.

Accordingly, the present invention provides a method of forming a chemical mechanical polishing pad, comprising the steps of providing a polyol storage tank with polymeric materials, providing a storage silo with microspheres and providing a isocyanate storage tank with isocyanates. The method further provides the steps of, delivering the polymeric materials and the microspheres to a premix run/prep tank, forming a pre-mixture of the polymeric materials and the microspheres. The method further provides the steps of, forming a mixture of the pre-mixture and the isocyanates, injecting the mixture into a closed mold and curing the polishing pad in the mold. Finally, the present invention provides degassing the polyol storage tank, isocyanate storage tank and the mold.

Figure 7:
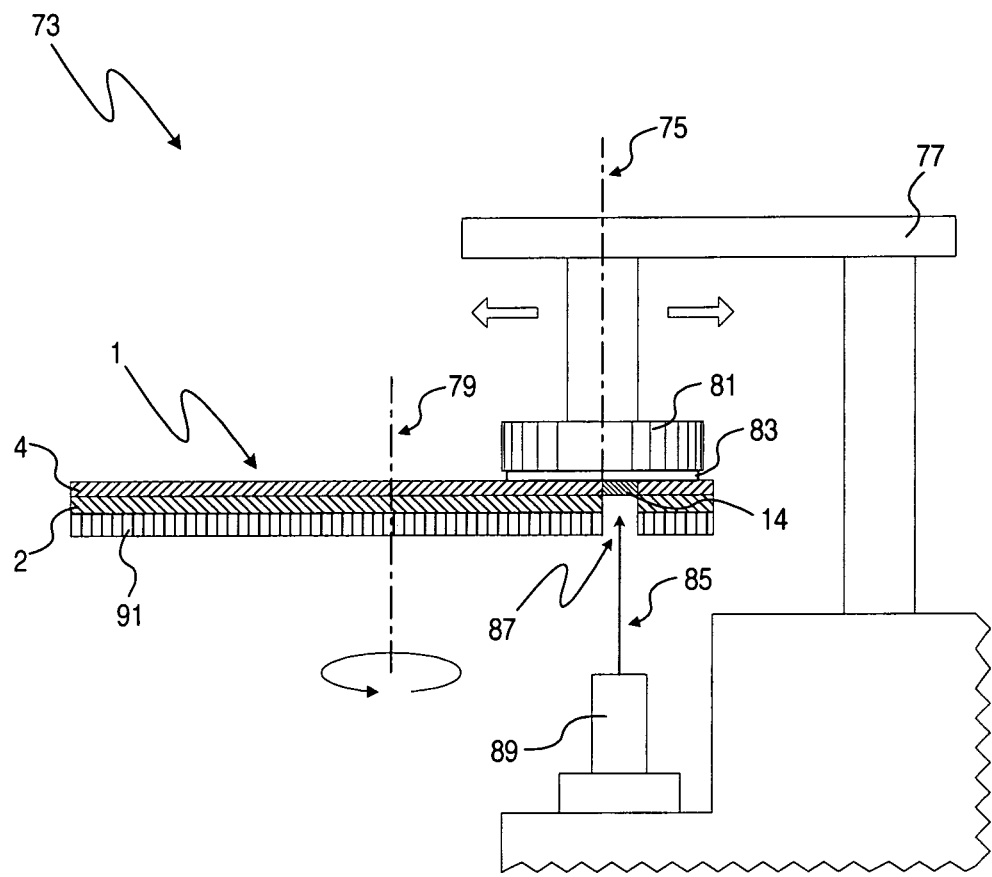
FIG. 7 illustrates a CMP system utilizing the polishing pad of the present invention.

Referring now to FIG. 7, a CMP apparatus 73 utilizing the reaction-injection molded polishing pad of the present invention is provided. Apparatus 73 includes a wafer carrier 81 for holding or pressing the semiconductor wafer 83 against the polishing platen 91. The polishing platen 91 is provided with a stacked polishing pad 1, including the reaction-injection molded polishing pad 4 of the present invention. As discussed above, pad 1 has a bottom layer 2 that interfaces with the surface of the platen 91, and a polishing pad 4 that is used in conjunction with a chemical polishing slurry to polish the wafer 83. Note, although not pictured, any means for providing a polishing fluid or slurry can be utilized with the present apparatus. The platen 91 is usually rotated about its central axis 79. In addition, the wafer carrier 81 is usually rotated about its central axis 75, and translated across the surface of the platen 91 via a translation arm 77. Note, although a single wafer carrier is shown in FIG. 7, CMP apparatuses may have more than one spaced circumferentially around the polishing platen. In addition, a transparent hole 87 is provided in the platen 91 and overlies the window 14 of pad 1. Accordingly, transparent hole 87 provides access to the surface of the wafer 83, via window 14, during polishing of the wafer 83 for accurate end-point detection. Namely, a laser spectrophotometer 89 is provided below the platen 91 that projects a laser beam 85 to pass and return through the transparent hole 87 and window 14 for accurate end-point detection during polishing of the wafer 83.

Accordingly, the present invention provides a method of forming a chemical mechanical polishing pad comprising the steps of, providing a tank with polymeric materials, a storage silo with microspheres and a isocyanate storage tank with isocyanates. Further, the method includes delivering the polymeric materials and the microspheres to a premix prep tank and forming a pre-mixture of the polymeric materials and the microspheres. The method further provides the steps of delivering the pre-mixture to a premix run tank, forming a mixture of the pre-mixture and the isocyanates, injecting the mixture into a closed mold and curing the polishing pad in the mold. Finally, the invention further provides degassing at least one of the polyol storage tank, isocyanate storage tank and the mold.

What is claimed is:

1. A method of forming a chemical mechanical polishing pad, comprising:
   providing a tank with polymeric materials;
   providing a storage silo with polymeric microspheres;

providing an isocyanate storage tank with isocyanates;
providing a premix prep tank for forming a pre-mixture of the polymeric materials and the polymeric microspheres;
providing a recirculation loop on the premix prep tank for controlling a bulk density of the pre-mixture in the premix prep tank;
providing an in-line densitometer in the recirculation loop for measuring the bulk density of the pre-mixture;
providing a premix run tank for storing the pre-mixture;
providing a mixer for blending the pre-mixture from the premix run tank and the isocyanates;
providing a reaction injection molding mold;
providing a vacuum;
delivering the polymeric materials and the polymeric microspheres to the premix prep tank forming a pre-mixture of the polymeric materials and the polymeric microspheres;
recirculating the pre-mixture through the recirculation loop on the premix prep tank and adding polymeric materials or polymeric microspheres to obtain a desired bulk density;
delivering the pre-mixture having the desired bulk density to the premix run tank;
delivering the pre-mixture having the desired bulk density from the premix run tank and the isocyanates to the mixer forming a mixture of the pre-mixture and the isocyanates;
injecting the mixture into a reaction injection molding mold; and,
curing the mixture to form a polishing pad in the reaction injection molding mold;
wherein the vacuum is used to degas at least one of the tank with polymeric materials, the isocyanate storage tank and the reaction injection molding mold.

2. The method of claim 1 further comprising:
providing the premix prep tank with an agitator; and
agitating the pre-mixture in the premix prep tank with the agitator.

3. The method of claim 1 wherein the polymeric materials are selected from, polytetramethylene ether glycol, polyethylene propylene glycol, polyoxypropylene glycol, polyethylene adipate glycol, polybutylene adipate glycol, polyethylene propylene adipate glycol, o-phthalate-1,6-hexanediol, poly(hexamethylene adipate) glycol, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, polyphthalate carbonate, poly(hexamethylene carbonate) glycol, diethyl toluene diamine ("DETDA"), 3,5-dimethylthio-2,4-toluenediamine and isomers thereof, 3,5-diethyltoluene-2,4-diamine and isomers thereof, such as 3,5-diethyltoluene-2,6-diamine, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline) ("MCDEA"), polytetramethyleneoxide-di-p-aminobenzoate, N,N'-dialkyldiamino diphenyl methane, p,p'-methylene dianiline ("MDA"), m-phenylenediamine ("MPDA"), methylene-bis 2-chloroaniline ("MBOCA"), 4,4'-methylene-bis-(2-chloroaniline) ("MOCK"), 4,4'-methylene-bis-(2,6-diethylaniline) ("MDEA"), 4,4'-methylene-bis-(2,3-dichloroaniline) ("MDCA"), 4,4'-diamino-3,3'-diethyl-5,5'-dimethyl diphenylmethane, 2,2',3,3'-tetrachloro diamino diphenylmethane, trimethylene glycol di-p-aminobenzoate, and blends thereof.

4. The method of claim 1 wherein the isocyanates are selected from methylene bis 4,4' cyclohexylisocyanate, cyclohexyl diisocyanate, isophorone diisocyanate, hexamethylene diisocyanate, propylene-1,2-diisocyanate, tetramethylene-1,4-diisocyanate, 1,6-hexamethylene-diisocyanate, dodecane-1,12-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethylcyclohexane, methyl cyclohexylene diisocyanate, triisocyanate of hexamethylene dilsocyanate, triisocyanate of 2,4,4-trimethyl-1,6-hexane diisocyanate, uretdione of hexamethylene diisocyanate, ethylene diisocyanate, 2,2,4-trimethyihexamethylene diisocyanate, 2,4,4-trimethyihexamethylene diisocyanate, dicyclohexylmethane diisocyanate, toluene diisocyanate (TDI), TDI prepolymer, methylene diphenyl diisocyanate (MDI), crude MDI, polymeric MDI, urethodione-modified MDI, carbodimide-modified MDI, and mixtures thereof.

5. The method of claim 1 further comprising adding a catalyst to the mixture.

6. A method of forming a chemical mechanical polishing pad, comprising:
providing a polyol storage tank with polymeric materials;
providing a storage silo with polymeric microspheres;
providing an isocyanate storage tank with isocyanates;
providing a premix run/prep tank for forming a pre-mixture of the polymeric materials and the unexpanded microspheres;
providing a recirculation loop on the premix run/prep tank to facilitate uniform distribution of the controlling a bulk density of the pre-mixture in the premix run/prep tank;
providing an in-line densitometer in the recirculation loop for measuring the bulk density of the pre-mixture;
providing a mixer for forming a mixture of the pre-mixture and the isocyanates;
providing a reaction injection molding mold for molding the mixture;
providing a vacuum;
delivering the polymeric materials and the polymeric microspheres to the premix run/prep tank forming a pre-mixture of the polymeric materials and the polymeric microspheres;
recirculating the pre-mixture through the recirculation loop on the premix run/prep tank until the desired bulk density is reached;
delivering the pre-mixture having the desired bulk density and the isocyanates to the mixer forming a mixture of the pre-mixture and the isocyanates;
injecting the mixture into the reaction injection molding mold and,
curing the mixture to form a polishing pad in the reaction injection molding mold;
wherein the vacuum is used to degas the polyol storage tank, the isocyanate storage tank and the reaction injection molding mold.

7. The method of claim 1, wherein the vacuum is used to degass at least the mold.

8. The method of claim 1, wherein the polymeric microspheres are hollow polymeric microspheres.

* * * * *